(12) United States Patent
Lee

(10) Patent No.: US 7,883,098 B2
(45) Date of Patent: Feb. 8, 2011

(54) SPINDLE BRACKET OF TORSION BEAM AXLE

(75) Inventor: Wonjae Lee, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 244 days.

(21) Appl. No.: 12/245,134

(22) Filed: Oct. 3, 2008

(65) Prior Publication Data

US 2009/0152939 A1 Jun. 18, 2009

(30) Foreign Application Priority Data

Dec. 15, 2007 (KR) .............. 10-2007-0131788

(51) Int. Cl.
*B60G 3/12* (2006.01)
(52) U.S. Cl. .............. 280/124.128; 248/300; 280/124.166
(58) Field of Classification Search .......... 280/124.128, 280/124.166; 248/300, 129
See application file for complete search history.

(56) References Cited

U.S. PATENT DOCUMENTS 491,091 A * 2/1893 Drake .................... 122/510
6,702,308 B2 * 3/2004 Yamaguchi .......... 280/124.166
2006/0033303 A1 * 2/2006 Shin .................... 280/124.128

FOREIGN PATENT DOCUMENTS

| JP | 11-208232 A | 8/1999 |
| JP | 2004-42690 A | 2/2004 |
| JP | 2004-231081 A | 8/2004 |
| KR | 10-2006-0014143 A | 2/2006 |

* cited by examiner

*Primary Examiner*—Eric Culbreth
(74) *Attorney, Agent, or Firm*—Morgan, Lewis & Bockius LLP

(57) ABSTRACT

A spindle bracket for a torsion beam axle includes a main body and first and second flanges. The main body defines an assembly hole for a spindle to be disposed therein. Two first flanges extend from either side of the main body, and are configured to be seated on and attached to a trailer arm. At least one second flange extends from the center of the main body, and is also configured to be attached to the trailing arm. The first and second flanges are parallel to one another, and perpendicular to the main body.

3 Claims, 1 Drawing Sheet

-- PRIOR ART --

SPINDLE BRACKET OF TORSION BEAM AXLE

CROSS-REFERENCE TO RELATED APPLICATIONS

The present application is based on, and claims priority from, Korean Application Serial Number 10-2007-0131788, filed on Dec. 15, 2007, the disclosure of which is hereby incorporated by reference herein in its entirety.

FIELD OF THE INVENTION

The present invention relates to a torsion beam axle for a vehicle rear wheel suspension system, and more particularly, to a spindle bracket welded to a torsion beam at three positions.

BACKGROUND OF THE INVENTION

A Coupled Torsion Beam Axle (CTBA) suspension system is often used as a rear wheel suspension system for small vehicles, due to its weight, cost and operation. As shown in FIG. 1, trailing arms 2 are welded to both ends of a torsion beam 1 extending in a lateral direction of a vehicle. One end of the each of trailing arms 2 is coupled with a vehicle body by a bolt with a bush 3 therebetween, and the other end is connected to a wheel 4 (only one of which is shown, for clarity). A torsion bar is inserted into torsion beam 1, and each end of the torsion bar is connected to one of the trailing arms 2.

A spindle bracket 5 is attached to the wheel-side end of each trailing arm 2. The wheels are connected to the trailing arms through the spindle brackets. A spring seat 6 is attached to the wheel-side end of the trailing arm so as to face the inside of the vehicle body. A suspension spring 7 is seated on and supported by the spring seat, and the other end of the suspension spring is connected to the vehicle body.

A typical spindle bracket 5 includes two vertical flanges, a horizontal flange, and a circular assembly hole into which a spindle coupled with the wheel 4 is inserted. The flanges are welded to the trailing arm.

Load applied through the wheel is transmitted to the torsion beam through the spindle bracket. The magnitude of the vertical load is three times as large or more as that of the lateral or longitudinal load.

The above information disclosed in this Background section is only for enhancement of understanding of the background of the invention and therefore it may contain information that does not form the prior art that is already known in this country to a person of ordinary skill in the art.

SUMMARY OF THE INVENTION

A spindle bracket for a torsion beam axle includes a main body and first and second flanges. The main body defines an assembly hole for a spindle to be disposed therein. Two first flanges extend from either side of the main body, and are configured to be seated on and attached to a trailer arm. At least one second flange extends from the center of the main body, and is also configured to be attached to the trailing arm. The first and second flanges are parallel to one another, and perpendicular to the main body.

Each of the first flanges may be provided with an arc-shaped seat groove so as to be seated on the trailing arm. The second flange may include a locking part to be attached to the trailing arm. Two second flanges may be provided. The bracket main body may define a slit at the center, with the two second flanges disposed on opposite sides of the slit.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

An embodiment of the present invention will be described in detail below with reference to accompanying drawings.

Figure 1:
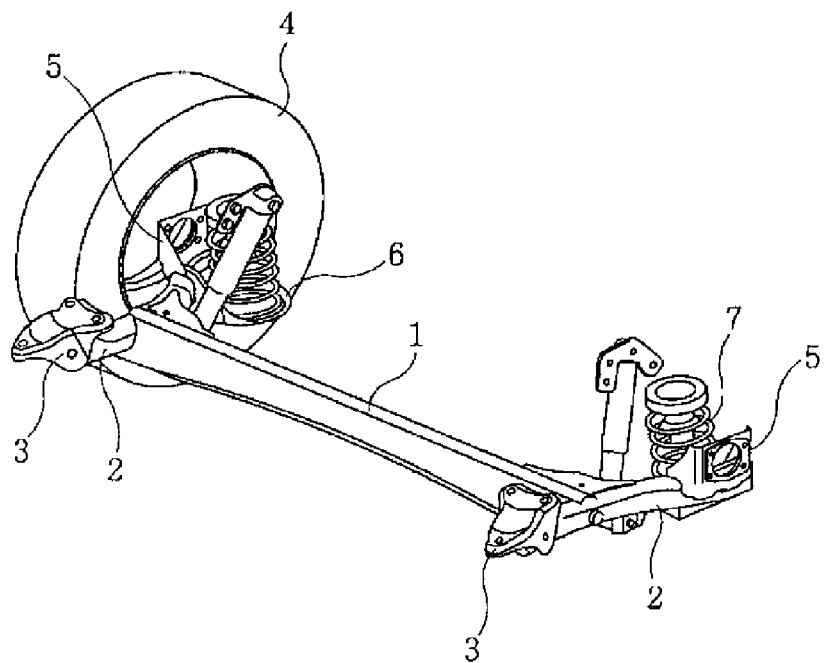
FIG. 1 is a perspective view of a spindle bracket and trailing arm of a torsion beam axle according to the prior art.
Figure 2:
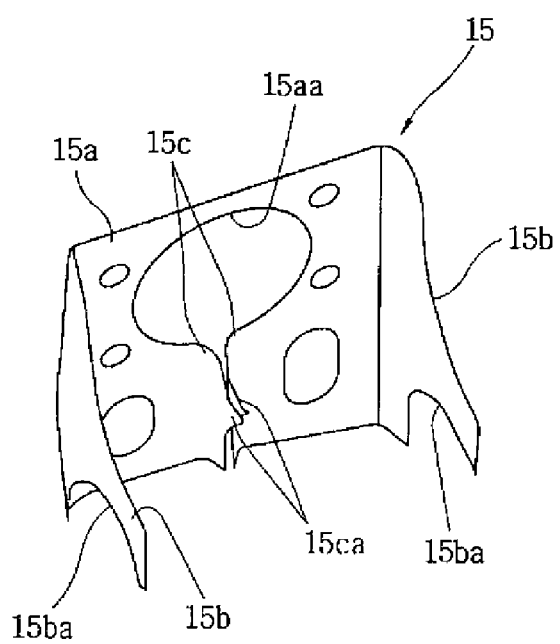
FIG. 2 is a perspective view of a spindle bracket according to an embodiment of the present invention.

The exemplary spindle bracket 15 shown in FIG. 2 is applicable to the typical torsion beam type suspension system of FIG. 1. The spindle bracket 15 is welded to the end of each trailing arm 2.

Spindle bracket 15 includes a quadrangular bracket main body 15a and two first vertical flanges 15b. The bracket body includes a circular assembly hole 15aa into which a spindle (not shown) coupled with a wheel 4 is inserted. The first vertical flanges extend from both sides of bracket body 15a, and are welded on the trailing arm such that they face laterally inward along the vehicle body. A substantially arc-shaped seat groove 15ba is formed on each vertical flange 15b that corresponds to the shape of the trailing arm 2. Therefore, the two vertical flanges are welded on the upper surface of the trailing arm through seat grooves 15ba.

Further, the lower middle portion of bracket body 15a includes a slit extending from the bottom edge to the assembly hole 15aa. The material on either side of the slit is bent to form two second vertical flanges 15c, each with a locking part 15ca protruding laterally inwards. The second vertical flanges are welded to the trailing arm so that locking parts 15ca are seated on the upper surface of the trailing arm. The two vertical flanges 15c may be welded to each other before being welded to the trailing arm.

As described above, the spindle bracket according to embodiments of the present invention is welded to the trailing arm at three positions. Accordingly, large vertical load, applied to the spindle bracket 15 through the wheel 4, is dispersed and supported by the three welded portions. Accordingly, stress concentration is reduced. Therefore, the welded portions will not rupture and mounting stability is improved over the prior art. Further, horizontal load is also effectively dispersed and supported by three welded portions. Since mounting rigidity is increased as described above, the size of the spindle bracket does not need to be increased. As a result, it is possible to reduce the weight and manufacturing cost of a vehicle.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A spindle bracket for a torsion beam axle comprising:
 a bracket main body defining an assembly hole configured for a spindle to be disposed therein;

two first flanges that extend from two lateral sides of the bracket main body, configured to be seated on and attached to a trailer arm; and at least one second flange extending from a substantially central position of the bracket main body and configured to be attached to the trailing arm;

wherein the bracket main body is substantially disposed in a first plane; wherein the two first flanges and the at least one second flange are substantially disposed in second, third, and fourth planes, respectively; wherein the second, third and fourth planes are substantially parallel to one another and substantially perpendicular to the first plane;

wherein the at least one second flange comprises two second flanges; and wherein the bracket main body further comprises a slit at the substantially central position, wherein the second flanges are disposed on opposite sides of the slit.

2. The spindle bracket as defined in claim 1, wherein each of the first flanges is provided with an arc-shaped seat groove so as to be seated on the trailing arm.

3. The spindle bracket as defined in claim 1, wherein at least one second flange comprises a locking part configured to be attached to the trailing arm.

* * * * *